(12) United States Patent
Henry et al.

(10) Patent No.: US 9,726,572 B2
(45) Date of Patent: Aug. 8, 2017

(54) METHOD AND SYSTEM FOR IDENTIFICATION OF A GIVEN GEOMETRICAL FEATURE OF AN OPTICAL COMPONENT

(71) Applicant: ESSILOR INTERNATIONAL (COMPAGNIE GENERALE D'OPTIQUE), Charenton le Pont (FR)

(72) Inventors: Patrick Henry, Charenton (FR);
Thomas Lassier, Charenton (FR);
Laurent Occhini, Selongey (FR);
Christian Rehn, Besancon (FR)

(73) Assignee: ESSILOR INTERNATIONAL (COMPAGNIE GENERALE D'OPTIQUE, Charenton-le-Pont (FR)

( * ) Notice: Subject to any disclaimer, the term of this patent is extended or adjusted under 35 U.S.C. 154(b) by 0 days.

(21) Appl. No.: 14/415,743

(22) PCT Filed: Jul. 5, 2013

(86) PCT No.: PCT/EP2013/064326
§ 371 (c)(1),
(2) Date: Jan. 20, 2015

(87) PCT Pub. No.: WO2014/019806
PCT Pub. Date: Feb. 6, 2014

(65) Prior Publication Data
US 2015/0226636 A1    Aug. 13, 2015

(30) Foreign Application Priority Data

Jul. 31, 2012 (EP) .................................... 12305941

(51) Int. Cl.
*G01B 9/00* (2006.01)
*G01M 11/02* (2006.01)
(Continued)

(52) U.S. Cl.
CPC ........... *G01M 11/025* (2013.01); *G01B 11/24* (2013.01); *G01B 11/255* (2013.01); *G01M 11/0257* (2013.01); *Y10T 29/49769* (2015.01)

(58) Field of Classification Search
CPC ........ G01B 9/00; G01B 11/255; G01M 11/00; G01M 11/0285; G01M 11/025; G01M 11/0257
(Continued)

(56) References Cited

U.S. PATENT DOCUMENTS 5,719,669 A * 2/1998 Ross, III .............. G01B 11/255
356/124
5,825,476 A * 10/1998 Abitol .................. G01B 11/255
356/124
(Continued)

FOREIGN PATENT DOCUMENTS

| EP | 0561178 A2 | 9/1993 |
|---|---|---|
| FR | 2879736 A1 | 6/2006 |
| WO | 0216902 A1 | 2/2002 |

OTHER PUBLICATIONS

International Search Report, dated Nov. 25, 2013, from corresponding PCT application.

*Primary Examiner* — Tarifur Chowdhury
*Assistant Examiner* — Isiaka Akanbi
(74) *Attorney, Agent, or Firm* — Young & Thompson (57) ABSTRACT

A method and system for identifying a given geometrical feature of an optical component or semi-finished ophthalmic lens blank, where an optical component is made of an organic material that can emit light at an emission wavelength $\lambda_e$ when being lighten at an illumination wavelength $\lambda_i$ different from the emission wavelength $\lambda_e$, a surface of the optical component is illuminated with an incident light beam including at least light at the illumination wavelength but devoid from light at the emission wavelength, light emitted (Continued)

at the emission wavelength by the illuminated surface is collected to build an image of the surface, and the surface image is processed to apply metrics to compare the image with reference data specific to the given geometrical feature.

15 Claims, 4 Drawing Sheets

(51) Int. Cl.
  *G01B 11/255* (2006.01)
  *G01B 11/24* (2006.01)
(58) Field of Classification Search
  USPC .................................................. 356/601, 124
  See application file for complete search history.

(56) References Cited

U.S. PATENT DOCUMENTS

| | | | |
|---|---|---|---|
| 6,542,249 B1* | 4/2003 | Kofman | G01B 11/2513 356/601 |
| 7,053,997 B2 | 5/2006 | Suzuki et al. | |
| 7,495,753 B2 | 2/2009 | Levecq et al. | |
| 2003/0112426 A1* | 6/2003 | Devie | G01B 11/255 356/124 |
| 2010/0007873 A1* | 1/2010 | Cado | G01M 11/0207 356/51 |
| 2011/0188052 A1* | 8/2011 | Sotgiu | B60C 25/0554 356/602 |
| 2012/0098963 A1* | 4/2012 | Yamagata | G01B 11/25 348/135 |
| 2012/0262724 A1* | 10/2012 | Nemoto | G01B 11/2518 356/601 |

* cited by examiner

METHOD AND SYSTEM FOR IDENTIFICATION OF A GIVEN GEOMETRICAL FEATURE OF AN OPTICAL COMPONENT

FIELD OF THE INVENTION

The invention relates to a method for identification of a given geometrical feature of an optical component and to a system adapted to implement the steps of the said method.

The invention further relates to a computer program product and a computer readable medium.

BACKGROUND OF THE INVENTION

The invention refers to optical components such as ophthalmic lenses or semi-finished lens blanks for ophthalmic lenses.

It is well known that such optical components comprise two surfaces having each, geometrical features adapted to form in combination an optical system suitable to attenuate/correct visual defects of a wearer.

The optical component has at least one of following surfaces: spherical surface, aspherical surface, sphero-toric surface, progressive surface, surface comprising a plurality of segments.

For example, among the geometrical features there are the curvature radii of at least one of these surfaces which can vary from one to other points of these surfaces. Indeed, a multisegment lens has a surface having a plurality of area, each area having a constant curvature radius usually called a segment. Thus, the number of segments of a lens is a geometrical feature which allows identifying if an ophthalmic lens or a semi-finished lens blank for ophthalmic lens is either a single vision or bifocal or trifocal lens. A progressive lens has a continuous varying curvature radius. A single vision lens has a spherical or aspherical or sphero-toric surface.

These geometrical features make it possible to characterize surfaces of the optical component and thus to identify them.

It is well-known methods of measurement of the geometrical structure of an optical component.

For example, method and system of mechanical palpation make it possible to determine the three-dimensional structure of a lens with a very high degree of accuracy. This method consists in placing a mechanical probe in direct contact with the surface of the lens then to memorize the position of contact probe-surface. This operation is repeated several hundreds of times on lens.

Nevertheless, this method is very long. For example, it requires approximately 20 minutes per face of the optical component. Moreover, it requires sometimes a destroying sample preparation, for example by fixation of lenses with glue.

Furthermore, its use requires calling upon expert operators and in a very constrained environment. Thus, it is not very compatible with a fast measure carried out in a laboratory of manufacture.

Optical methods also exist to determine with precision the surface of a lens knowing other surface. For example, the patent application WO 02/16902 A1 describes a method and an apparatus for transmission measurement of the geometric structure of an optical component. The described method makes it possible to measure one or more polished surfaces or the distribution of index of an optical component. Nevertheless, this method is expensive to implement.

Consequently, there is a need for a method making it possible to identify fastly and in a reliable manner geometrical features of optical components such as lenses or semi-finished lens blanks.

SUMMARY OF THE INVENTION

The aim of the present invention is to overcome these disadvantages by proposing a method and a system for fast identification of a geometrical feature of an optical component and without contact with the optical component. Those will be in particular useful in the ophthalmic field for the control or the measure of optical components such as ophthalmic lenses. However, other applications may be considered in the ophthalmic field.

Therefore, the invention relates to a method for identification of a given geometrical feature of an optical component, chosen within the list consisting of an ophthalmic lens or a semi-finished lens blank for ophthalmic lens, said method comprising the following steps consisting of:
  providing the optical component made of an organic material with the proviso that said material can emit light at an emission wavelength $\lambda_e$ when being lighten at an illumination wavelength $\lambda_i$ which is different from the emission wavelength $\lambda_e$;
  illuminating a surface of the optical component with an incident light beam comprising at least light at the illumination wavelength but devoid from the light at the emission wavelength;
  collecting light emitted at the emission wavelength by the illuminated surface of the optical component to build an image of the said surface; and
  processing said image by implementing computer means and applying a metrics to compare the image with reference data that are specific to the given geometrical feature and providing an identification output of said given geometrical feature.

Thanks to the invention, it is now possible to identify an optical component, such a lens or a semi-finished lens blank, without any contact with the optical component and without any intervention of an operator. This allows high production rate.

According to an embodiment, the method is implemented by technical means, as for example by computer means controlling such a machine.

According to various embodiments that can be combined according to all the possible combinations:
  said surface of the optical component is illuminated in an illumination direction with an incident light beam having the form of a sheet of light substantially perpendicular to said surface of the optical component
  said method comprises the following steps of:
    illuminating in an illumination direction said surface of the optical component with an incident light beam having the form of a sheet of light substantially perpendicular to said surface of the optical component;
    collecting light emitted at the emission wavelength by the illuminated surface of the optical component in a viewing direction to build an image of the said surface, the angle between illumination and viewing directions is substantially between 5° and 90° and preferably substantially equal to 85°; and
    processing the image in such a manner to produce a profile of a curve, the curve being formed by the intersection of the sheet of light and said surface, and producing the identification output of said given geometrical feature from the profile of the curve;

said method further comprises a step for determining at least one curvature radius of the produced profile of the curve;

said method further comprises a step for determining a size parameter of the illuminated surface of the optical component;

the optical component has at least a spherical or aspherical surface, a sphero-toric surface, a progressive surface, a surface comprising a plurality of segments;

said method further comprises a step of translating continuously the optical component along a translation direction perpendicular to the sheet of light in such a manner as to produce an image scanning of the surface; and the optical component is made of an organic material chosen within the list consisting of: polycarbonate (PC), polymethyl methacrylate (PMMA), CR39, CR607, MR8, MR7, Trivex.

Furthermore, the invention also proposes a computer program product comprising one or more stored sequence of instructions that is accessible to a processor and which, when executed by the processor, causes the processor to carry out at least one of the steps of the different embodiments of the preceding method.

The invention also proposes a computer readable medium carrying out one or more sequences of instructions of the preceding computer program product.

Moreover, the invention also proposes a method for packing an optical component in a corresponding package, said package having a characterizing feature. The said method comprises using the method for identification of a feature of an optical element according to the invention so as to identify a given geometrical feature of the optical component and then selecting the corresponding package thanks to correlation rules between said given geometrical feature of the optical element and the characterizing feature of the corresponding package.

Furthermore, the invention also proposes a method for manufacturing a spectacle lens from a semi-finished lens blank for ophthalmic lens comprising a finished optical surface and a non-finished surface, said method comprising the following steps:

using the previous method for identification of a feature of an optical element according to the invention in such a manner as to identify a given geometrical feature of the finished optical surface of the semi-finished lens blank; and machining the non-finished surface of the semi-finished lens blank so as to obtain a prescription-optimized surface taking into account at least both individual data of a spectacle prescription and the said geometrical feature of finished optical surface of the semi-finished lens blank.

Moreover, the invention also proposes a system for identification of a given geometrical feature of an optical component, the system comprising:

an illumination source adapted to illuminate a surface of the optical component with an incident light beam;

an imaging and detecting device adapted to collect the light emitted at an emission wavelength by the surface of the optical component to build an image of the surface; and an image-processing device which comprises algorithms for applying a metrics to compare the image with reference data that are specific to the given geometrical feature and providing an identification output of said given geometrical feature.

Said system is suitable to carry out the here above described method for identification of a given geometrical feature of an optical component according to the present invention.

According to various embodiments, the system comprises one or several of the following features, taken isolation or in any technically feasible combination:

the illumination source adapted to illuminate in an illumination direction a surface of the optical component with an incident light beam having the form of a sheet of light (56) substantially perpendicular to said surface of the optical component;

the system is such that:

the illumination source is adapted to illuminate in an illumination direction said surface of the optical component with an incident light beam having the form of a sheet of light substantially perpendicular to said surface of the optical component;

the imaging and detecting device is adapted to collect the light emitted by the surface of the optical component in a viewing direction, the angle between illumination and viewing directions is substantially between 5° and 90° and preferably substantially equal to 85°; and the image-processing device comprises algorithms for producing a profile of a curve, the curve being formed by the intersection of the sheet of light and said surface, and for producing the identification output of said given geometrical feature from the profile of the curve;

said image-processing device comprises algorithms for determining at least one curvature radius of the produced profile of the curve;

said system further comprises a translation device for continuously translating the optical component along a translation direction perpendicular to the illumination direction, and wherein imaging and detecting device is synchronized with translation device;

said system further comprises a device adapted to determine a size parameter of the illuminated surface of the optical component; and the optical component is made of an organic material chosen within the list consisting of: polycarbonate (PC), polymethyl methacrylate (PMMA), CR39, CR607, MR8, MR7, Trivex.

BRIEF DESCRIPTION OF THE DRAWINGS

Further features and advantages of the invention will appear from the following description of embodiments of the invention, given as non-limiting examples, with reference to the accompanying drawings listed hereunder.

Elements in the figures are illustrated for simplicity and clarity and have not necessarily been drawn to scale. For example, the dimensions of some of the elements in FIGS. 1, 3 and 7 may be exaggerated relative to other elements to help improving the understanding of the embodiments of the present invention.

A more detailed description of the method and the device for identification of a given geometrical feature of an optical component, according to the invention, will now be given with reference to FIGS. 1 to 7.

DETAILED DESCRIPTION OF THE INVENTION

The present invention applies for all kind of optical components chosen within the list of an ophthalmic lens or a semi-finished lens blank for ophthalmic lens. The ophthalmic lens can be a single vision lens, a bifocal lens, a trifocal lens or a progressive addition lens. The semi-finished lens blank may be suitable to machine one of the preceding ophthalmic lenses.

The optical component typically comprises an optical substrate made of an optically transparent material. Preferentially, the present invention applies for all kind of optical components made of an organic material chosen within the list consisting of: polycarbonate (PC, n=1.591), polymethyl methacrylate (PMMA, n=1.49 or 1.50), CR39 (n=1.5), CR607 (n=1.5), MR8 (n=1.6), MR7 (n=1.67), Trivex (n=1.53).

Particularly, the organic material is adapted to emit at an emission wavelength $\lambda_e$ when being lighten at an illumination wavelength $\lambda_i$ which is different from the emission wavelength $\lambda_e$. Thus, the optical component is made of an organic material which can emit fluorescence when being lighten at a suitable illumination wavelength.

The optical component comprises a first face and a second face and connected one to another by a side face. The side face can be substantially in form of a surface of a cylinder. The first face and the second face are defined respectively by a first surface and a second surface. The first and the second surfaces can be spherical, aspherical, multi-segments such as bifocal, trifocal, progressive, convex or concave and can have an optical coating chosen among the list of: an anti-soiling coating, an anti-reflective coating, an anti-dust coating, a tinting coating, a polarizing coating or a combination of any of preceding compatible coatings.

For example, an optical component such as an ophthalmic lens or a semi-finished lens blank for ophthalmic lens has a convex face and the other face is concave.

Moreover, it is well-known to define an optical axis of the optical component by a straight line perpendicular to both faces of the optical component along which path rays of light will pass through the optical component without deviation.

Figure 1:
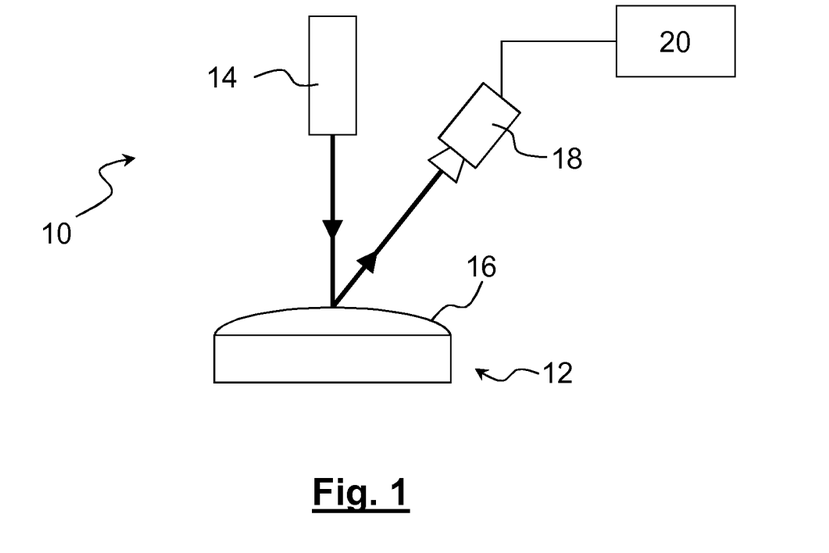
FIG. 1 is a schematic diagram illustrating a first embodiment of a system for identification of a given geometrical feature of an optical component according to the invention.

FIG. 1 illustrates a first embodiment of a system 10 for identification of a given geometrical feature of an optical component 12 according to the invention. The given geometrical feature is for example the number of different curvature radii, value(s) of the curvature radius (ii), center thickness, edge thickness, total thickness.

The system 10 comprises an illumination source 14 adapted to illuminate one surface 16 of the optical component 12 with an incident light beam.

Preferably, the illumination source 14 is adapted to emit ultra-violet radiation, for example at 405 nm.

Moreover, the illumination source 14 is adapted to illuminate continuously or in a pulsed manner.

The system 10 further comprises an imaging and detecting device 18 adapted to collect the light emitted at an emission wavelength by the illuminated surface 16 of the optical component 12 to build an image of the illuminated surface 16. Preferably, the imaging and detecting device 18 comprises an optical filter adapted to reject the light having a wavelength equal to the illumination wavelength $\lambda_i$.

Preferably, the imaging and detecting device 18 is sensitive in visible band radiation.

Furthermore, the system 10 comprises an image-processing device 20 connected to and preferably synchronized with the imaging and detecting device 18.

The image-processing device 20 comprises algorithms for applying a metrics to compare the image with reference data that are specific to the given geometrical feature.

Moreover, the image-processing device 20 comprises algorithms for providing an identification output of said given geometrical feature.

For example, the identification output is suitable to differentiate single vision lenses, bifocal lenses, trifocal lenses or progressive addition lenses.

According to a first sub-embodiment of the first embodiment, the system 10 comprises a device adapted to determine a size parameter of the illuminated surface 16 of the optical component 12.

For example, the size parameter of the illuminated surface 16 is the transversal dimensions of the optical component 12, i.e. the mean diameter of the optical component.

According to a second sub-embodiment of the first embodiment compatible with the first sub-embodiment, the system 10 further comprises a translation device for continuously translating the optical component 12 along a translation direction perpendicular to the illumination direction.

Preferably, the translation device is capable of translating the optical component 12 at a translation speed substantially between 1 and 10 m/min, for example equal to 4 m/min.

The imaging and detecting device 18 is synchronized with the translation device.

The system 10 is adapted to carry on the steps of the method for identification of a given geometrical feature of an optical component according to the invention.

According to a third sub-embodiment of the first embodiment compatible with the first and the second sub-embodiments, the illumination source is further adapted to illuminate in an illumination direction the surface 16 of the optical component 12 with an incident light beam having the form of a sheet of light 56 substantially perpendicular to said surface 16 of the optical component 12.

Figure 2:
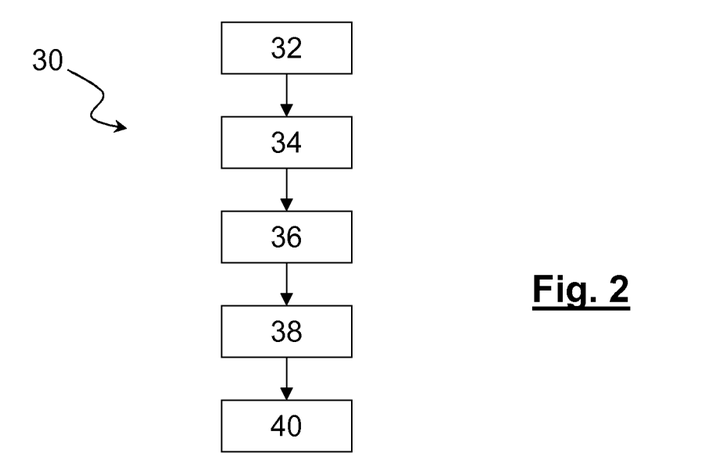
FIG. 2 is an exemplary flowchart illustrating steps of a first embodiment of a method according to the invention for identification of a given geometrical feature of an optical component and which can be carried on by the system of FIG. 1.

The method 30 for identification of a given geometrical feature of an optical component according to the invention will now be described in details with reference to FIG. 2.

The method 30 comprises a step 32 for providing the optical component 12.

Then, during a step 34, one surface 16 of the optical component 12 is illuminated with an incident light beam by the illumination source 14. The incident light beam comprises at least light at the illumination wavelength $\lambda_i$ but devoid from the light at the emission wavelength $\lambda_e$.

The method 30 further comprises a step 36 for collecting the light emitted at the emission wavelength $\lambda_e$ by the illuminated surface 16 of the optical component 12 in order to build an image of the surface 16. The collecting step 36 is implemented by the imaging and detecting device 18.

Said image is then processed in 38 by implementing computer means and applying a metrics to compare the image with reference data. The reference data are specific to the given geometrical feature.

Then, an identification output of said given geometrical feature is provided in 40.

For example, the identification output is adapted to differentiate single vision lenses, bifocal lenses or trifocal lenses or progressive addition lenses.

So, thanks to the method 30 and the system 10 for identification of a given geometrical feature, it is now possible to easily discriminate for example single vision lenses from multifocal lenses, single vision lenses from other single vision lenses, single vision lenses from progressive lenses, and so on . . . . Said discrimination can be done without any contact of the system with the lenses. That thus makes it possible to avoid any handling being able to lead to deterioration or soiling of the optical component.

Optionally, the method 30 can further comprise a step for determining a size parameter of the illuminated surface of the optical component for example by the device adapted to determine a size parameter according to the first sub-embodiment of the first embodiment of the system 10. For example, the size parameter of the illuminated surface is the transversal dimensions of the optical component.

According to another sub-embodiment compatible with the previous one, the method 30 further comprises a step for translating continuously the optical component 12 along a translation direction perpendicular to illumination direction in such a manner as to produce an image scanning of the surface.

Thus, the produced image scanning of the surface permits a more precise identification of the optical component.

In consequence, these method and system make it possible an identification at high rate.

According to another sub-embodiment compatible with the previous one, the method 30 further comprises a step 74 for illuminating in an illumination direction said surface of the optical component with an incident light beam having the form of a sheet of light substantially perpendicular to said surface of the optical component.

Figure 3:
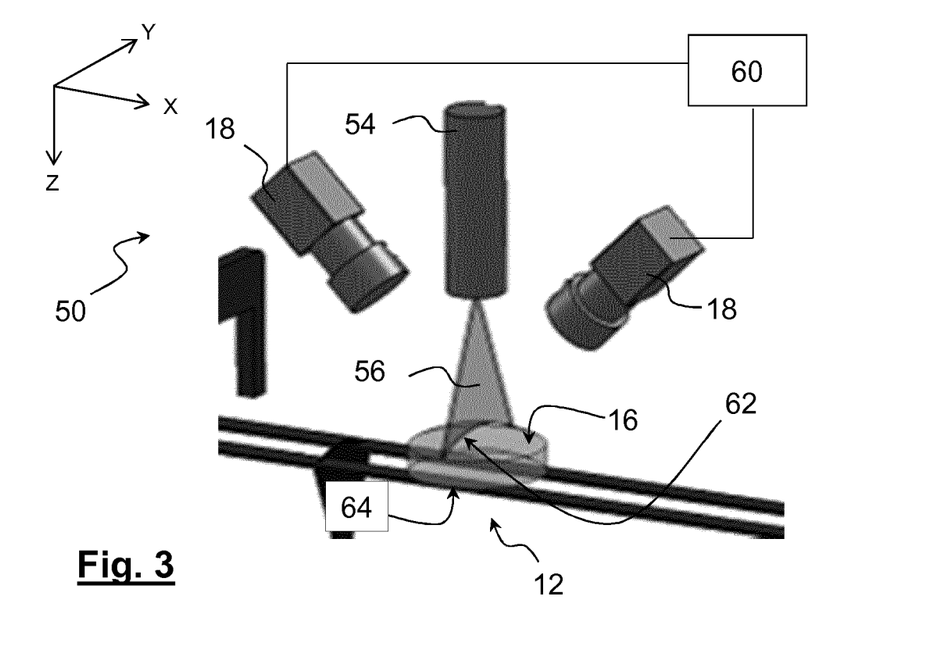
FIG. 3 is a schematic diagram illustrating a second embodiment of a system according to the invention.

In reference to FIG. 3 and according to a second embodiment of a system 50 comprising the same elements than in the first embodiment and whatever the sub-embodiment thereof, the illumination source 54 is further adapted to illuminate in an illumination direction the surface 16 of the optical component 12 with an incident light beam having the form of a sheet of light 56 substantially perpendicular to said surface 16 of the optical component 12.

With regard to FIG. 3, the illumination direction is along the Z-axis, the sheet of light is parallel to a plane defined by Z-axis and Y-axis and the optical component 12 has an optical axis substantially parallel to Z-axis.

For example, the illumination source 54 is a laser sheet light source emitting ultra-violet radiation.

Furthermore, the imaging and detecting device 18 is adapted to collect the light emitted by the illuminated surface 16 of the optical component 12 in a viewing direction. The angle between illumination and viewing directions is substantially between 5° and 90° and preferably substantially equal to 85°.

The imaging and detecting device 18 is sensitive in visible band radiation.

Moreover, the image-processing device 60 further comprises algorithms for producing a profile of a curve 62. The curve 62 is formed by the intersection of the sheet of light 56 and said surface 16, and for producing the identification output of said given geometrical feature from the profile of the curve 62.

According to a non-limiting preferred sub-embodiment, the image-processing device 60 further comprises algorithms for determining at least one curvature radius of the produced profile of the curve 62.

From the number of determined curvature radii, it is then further possible to identify if the optical component 12, such a semi-finished spectacle lens blank or a finished spectacle lens, is a single vision lens, a bifocal lens, a trifocal lens or a progressive addition lens.

According to a second sub-embodiment compatible with the previous one, the system 50 comprises another imaging and detecting device 18 adapted to collect the light emitted by the same surface 16 of the optical component 12 in another viewing direction.

The angle between illumination and viewing directions is substantially between 5° and 90° and preferably substantially equal to 85°. For example, the illumination direction is a symmetric axis of the viewing direction and the other viewing direction.

The other imaging and detecting device 18 is sensitive in visible band radiation.

It may be useful to have another imaging and detecting device 18 if the face 16 is multifocal or progressive; one can have a single imaging and detecting device 18 if the face is spherical or aspherical. A single imaging and detecting device 18 is suitable for collecting light emitted by the concave surface 64. Indeed, in the case of the optical component is a bifocal lens, the segment could be detected by at least one of the two imaging and detecting device 18 whatever the orientation of the bifocal lens.

Thus, according to a third sub-embodiment compatible with the other sub-embodiments of the second embodiment of the system 50, the system 50 further comprises a second illumination source 54 adapted to illuminate another surface 64 of the optical component 16 with a second incident light beam.

Preferably, the other surface is the second surface 64 opposed to the first surface 16 of the optical component 12 described above.

For example, the second illumination source 54 is configured such that the first incident light beam and the second incident light beam propagate in opposed directions.

The second incident light beam comprises at least light at the illumination wavelength but devoid from the light at the emission wavelength and have the form of a sheet of light substantially perpendicular to said second surface 64 of the optical component 12.

Moreover, the system 50 comprises a second imaging and detecting device 18 adapted to collect the light emitted at the emission wavelength by the second surface 64 of the optical component 12 to build an image of the second surface.

Furthermore, the system 50 comprises a second image-processing device 60 adapted to compare the image of the second surface 64 with reference data that are specific to the given geometrical feature of the second surface of the optical component.

Of course, the image-processing device 60 adapted to process the image of the first surface 16 can be adapted to process the image of the second surface 64 of the optical component 12.

Figure 4:
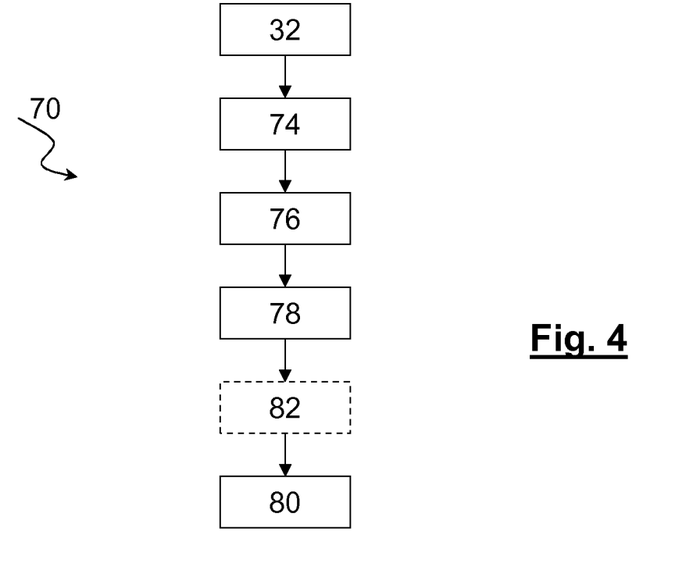
FIG. 4 is an exemplary flowchart illustrating steps of a second embodiment of a method according to the invention which can be carried on by the system of FIG. 3.

A second embodiment of the method for identification of a given geometrical feature of an optical component according to the invention will now be described in details with reference to FIG. 4. This second embodiment of the method can be implemented by the second embodiment of the system 50 according to the invention.

In this embodiment, the method 70 comprises a step 32 for providing the optical component 12.

Then, during a step 74, one surface 16 of the optical component 12 is illuminated in an illumination direction with an incident light beam by the illumination source 54. The incident light beam has the form of a sheet of light 56 substantially perpendicular to said surface 16 of the optical component 12. The incident light beam comprises at least light at the illumination wavelength but devoid from the light at the emission wavelength.

Moreover, the light emitted at the emission wavelength by the surface of the optical component is collected in a viewing direction to build an image of the illuminated surface in 76 by the imaging and detecting device 18. The viewing direction is such that the angle between illumination and viewing directions is substantially between 5° and 90° and preferably substantially equal to 85.

If the optical component is moved by a translation device, plus the angle is close to 90° and more the passage of the optical component on the translation device will be constrained. Nevertheless, more the angle will be small and less emission light will be collected.

Then, the image is processed in 78 in such a manner to produce a profile of a curve and the identification output of said given geometrical feature is produced from the profile of the curve 62 in 80. It is reminded here that the curve 62 is defined by the intersection of the sheet of light and said surface 16 of the optical component 12.

A calculation is carried out to take into account the angle under which the profile is seen by imaging and detecting devices 18 to deduce the exact radius or radii from it.

Figure 5:
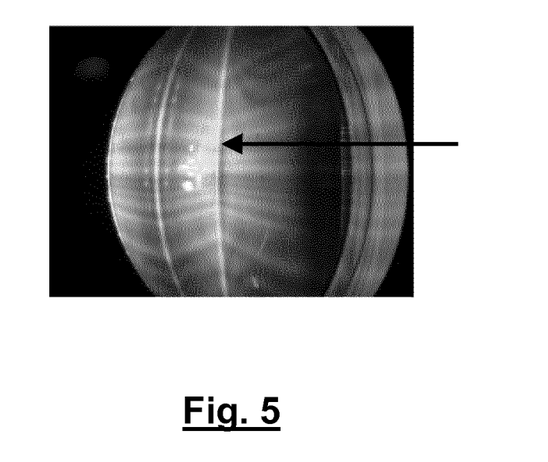
FIG. 5 is an example of an image acquired by the system of FIG. 3 on a single vision lens.

An example of an image of an illuminated surface of a single vision lens is shown on FIG. 5 and the corresponding curve is indicated by the arrow.

Figure 6:
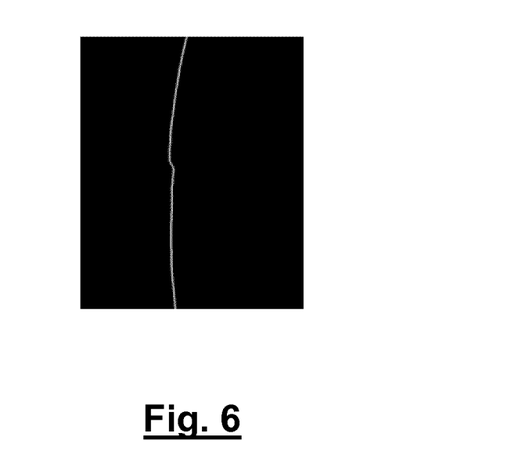
FIG. 6 is an example of a profile of a surface of a bifocal lens obtained by the system of FIG. 3.

Moreover an example of a curve on the surface of a bifocal lens is shown on FIG. 6. Two segments can be identified, each corresponding to a curvature radius.

According to a sub-embodiment of the method 70, at least one curvature radius of the produced profile of the curve can then be determined in 80 by the image-processing device 60.

From the number of determined curvature radii, it is then possible to identify if the optical component, such a semi-finished spectacle lens blank or a finished spectacle lens, is a single vision lens, a bifocal lens, a trifocal lens or a progressive addition lens.

Moreover, the value of the or of each curvature radius of the produced profile of the curve allows an identification of the optical component.

Of course, the method 70 can further comprise a step for translating continuously the optical component along a translation direction perpendicular to the sheet of light 56 in such a manner as to produce an image scanning of the surface as in the first embodiment of the method 30.

This second embodiment can be implemented to identify a geometrical feature of the first face of the optical component by a system according to the second embodiment and also to identify a geometrical feature of the second face of the optical component by another similar system.

Thus, it is possible to identify for example the number and the value of the curvature radius of each face, convex or concave, of an optical component.

Figure 7:
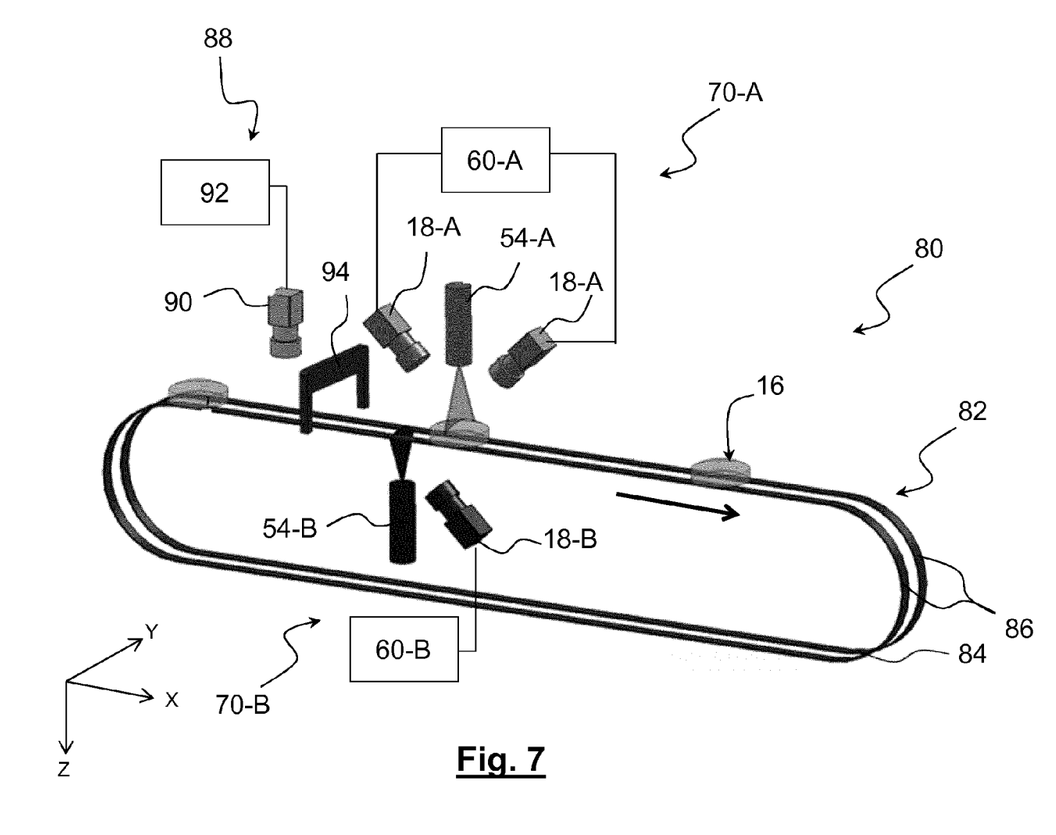
FIG. 7 is a schematic diagram illustrating a sub-embodiment of the second embodiment of the system of FIG. 3.

FIG. 7 illustrates a sub-embodiment of the second embodiment of the system of identification of a given geometrical feature of an optical component.

This system 80 comprises a first system 70-A dedicated to the identification of a geometrical feature of a first face 16, for example convex, of an optical component 12 and a second system 70-B dedicated to the identification of a geometrical feature of the second face of the optical component 12, for example concave.

The first system 70-A comprises two imaging and detecting device 18-A in order to identify for example the number of segments the first surface has. The presence of segment and determination of how many segments are on the first surface (one segment for a bi focal lens, two segments for a tri focal lens) is made by system 88.

The first system 70-A can also be used to determine the curve radius or radii of the first surface, The illumination directions of the illumination sources 54-A, 54-B are parallel but distinct in order to illuminate sequentially the concave face then the convex face and not to disturb the opposed imaging and detecting device 18-A, 18-B. Of course, the order of illumination of the faces can be inverted.

For this purpose, the system 80 comprises a translation device 82 adapted to translate continuously the optical component along a translation direction. For example, each optical component is disposed on an adapted conveyor 84 so that the illumination sources 54-A, 54-B can illuminate both surfaces. For this purpose, the conveyor 84 comprises two conveyor belts 86 as illustrated on FIG. 7 spaced one of the other in order to support two opposite ends of one of the faces 64 of the optical component and moving at the same speed.

Thus, it is possible to identify a geometrical feature of a face 64 then after a few minutes necessary to the displacement of the optical component 16 to identify a geometrical feature of the other face.

Moreover, in this illustrated sub-embodiment of FIG. 7, the system comprises a device 88 adapted to determine a size parameter of the optical component 12. The size parameter of the optical component can be for example its diameter. The device 88 can also be used for determining whether segment(s) can be detected, identifying the form of such a segment.

For example, this device 88 is disposed upstream systems 70-A and 70-B, the term upstream referring within the translation direction, indicated by the arrow, of the optical components on the conveyor.

This device 88 comprises an imaging device 90 adapted to acquire an image of an optical component disposed on the conveyor. The axis of the camera is appreciably parallel to the optical axis of the optical component 12.

Moreover, the imaging device 90 is connected to an image-processing device 92 comprising algorithms for extracting from the image a size parameter of the optical component, for example a mean transverse diameter. It can also determine whether the optical component has segments, and if yes, what the shape of said segment is.

The system 80 comprises moreover a positioning device 94 for positioning accurately the optical components on the conveyor 84. For example, this positioning device 94 comprises a light gate adapted to determine the center of the optical components on the conveyor. Pliers, which are not shown on FIG. 7 but are part of the positioning device 94, are used to center the optical element thanks to the information provided by the light gate. In the FIG. 4, the positioning device 94 is disposed downstream the device 88. Naturally, this relative order in the flow could be inversed.

The light gate comprises a transmitter, such a laser diode, and a photosensitive receiver adapted to receive a signal, such a laser beam, transmitted by the transmitter. Such a light gate may be adapted also to measure a size parameter of the optical component.

This positioning device 94 makes it possible to align the optical components on the conveyor so that they can correctly be illuminated thanks to the synchronisation between the conveyor and illumination sources and the imaging and detecting devices.

Under operation, the optical components are disposed, preferably regularly, on the conveyor by an automat or manually by an operator. Thereafter, the lower face refers to the face of the optical component in contact with the conveyor and the other face being called the top face.

The optical component then passes in the positioning device 94 in order to position the optical axis of the optical component substantially according to a predetermined position compared to the conveyor, preferably on the median line of the conveyor.

The positioning device 94 allows the synchronisation between the conveyor and illumination source and the imaging and detecting devices. Indeed, when an optical component passes in the positioning device 94, the laser beam is cut and the receiver does not receive the signal sent by the transmitter any more. The diameter of the optical component is deduced from the translating speed which is perfectly known and from measured time during which the beam is cut.

So, the center of the optical component can be precisely positioned at any time according to illumination sources and imaging and detecting devices. Passage of the center of the optical component can also be synchronized with illumination and image acquisition.

Then an image of the top face is acquired by imaging and detecting device 90. This one is then transmitted to the image-processing device 92 in order to be processed there and to obtain for example a measure of the mean diameter of the optical component 12. Information regarding the optical component type (single vision, multifocal, type of segment(s)) can also be obtained.

The optical component is translated by the conveyor to the vertical of an illumination source for the identification of a geometrical feature of the lower face. The illumination source emits a sheet of light in direction of the lower face of the optical component, for example at 405 nm. In reaction to this excitation, the curve defined by the intersection of the sheet of light and the lower face emits fluorescence, for example light emitted at 480 nm.

The imaging and detecting device associated with the illumination source which is directed to the lower surface of the optical component collects fluorescence while rejecting the light emitted at the illumination wavelength in order to reject the incident light or light reflected by the optical component.

The acquired image of the lower face is then processed in order to obtain a profile of the lower surface.

Then the optical component is translated by the conveyor to the vertical of another illumination source for the identification of a geometrical feature of the top face. According to the same method, a profile of the top surface is obtained.

Information relating to the profile of the lower surface and those relating to the profile of the top surface, as well as those relating to the diameter of the optical component make it possible to identify the optical component. Of course, it is not necessary to determine the whole of these geometrical features. Nevertheless, more there are geometrical features of the optical component determined and more the identification of the optical component is robust and reliable.

The measure and the data processing are fast allowing a processing of lenses at a high rate.

The Applicant carried out tests to identify the curvature radii of the top face, the diameter of the optical component and the thickness of the optical component. For single lens, the duration of a cycle of measurement and treatment (also called "instantaneous cycle time") is equal to 2.4 s, which is equivalent to 1500 lenses per hour.

Of course, it is understood that an illumination in pulsated mode is sufficient to determine a curvature radius of a single lens while an illumination in continuous mode, i.e. higher than 1 second is necessary to determine the curvature radii of multifocal lenses.

Another advantage of a system and a method according to the invention is that they do not require any human intervention during the identification of at least a geometrical feature of the optical component.

Thanks to this method it is thus possible to check if a surface is in conformity with preformatted data and to detect eventual defaults on the surface. It also makes it possible to sort optical components according to at least one geometrical feature of a surface of the optical component for example to detect bifocal or trifocal lenses inside a single vision lenses flow.

Another aspect of the invention relates to a method for packing an optical component in a corresponding package. Such a method comprises a step consisting of using the previous method whatever the embodiment in such a manner as to identify a given geometrical feature of the optical component. The corresponding package with correlation rules between said given geometrical feature and the corresponding package is then selected.

Thus, such a method for packing carried on in production factory, such as spectacle lenses or a semi-finished spectacle lens blanks, prevents the mispacking of any lenses with a short cycle time.

Another aspect of the invention relates to a method for manufacturing a spectacle lens from a semi-finished spectacle lens blank comprising a finished optical surface and a non-finished surface. Said method comprises a step consisting of using the method previous method for identification of a feature of an optical element and to measure a given geometrical feature of a finished optical surface of the semi-finished spectacle lens blank. Then, the method further comprises a step for machining and/or finishing the non-finished surface of the semi-finished lens blank so as to obtain a prescription-optimized surface taking into account at least both individual data of a spectacle prescription and the said geometrical feature of finished optical surface of the semi-finished lens blank.

This method thus makes it possible to optimize the optical quality of a finished lens by using actual values of the front face in optimization calculation of the back face.

Furthermore, the invention also relates to a computer program product comprising one or more stored sequence of instructions that is accessible to a processor and which, when executed by the processor, causes the processor to carry out at least one of the steps of the different embodiments of the preceding methods and preferably at least the step of processing the image.

The invention also proposes a computer readable medium carrying out one or more sequences of instructions of the preceding computer program product.

Unless specifically stated otherwise, as apparent from the following discussions, it is appreciated that throughout the specification discussions utilizing terms such as "evaluating", "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be noted more generally that the invention is not limited to the examples described and represented.

The invention claimed is:

1. A method for identification of a given geometrical feature of an optical component, said method comprising:
providing (32) the optical component (12), said optical component (12) selected from the group consisting of an ophthalmic lens and a semi-finished ophthalmic lens blank, and said optical component (12) composed of an organic material that emits light at an emission wavelength $\lambda_e$ when illuminated by an illumination wavelength $\lambda_i$, said emission wavelength $\lambda_e$ being different from said illumination wavelength $\lambda_i$;
illuminating (34, 74) a surface (16, 64) of the optical component with an incident light beam comprising at least light at the illumination wavelength but devoid from the light at the emission wavelength, said surface of the optical component being illuminated in an illumination direction with the incident light beam having the form of a sheet of light (56) substantially perpendicular to said surface of the optical component;
collecting (36, 76) light emitted at the emission wavelength by the illuminated surface of the optical component in a viewing direction to build an image of said surface, an angle between the illumination direction and the viewing direction being substantially between 5° and 90°; and
processing said image by implementing computer means that applies metrics to compare the image with reference data that are specific to the given geometrical feature and produces and stores an identification output of said given geometrical feature that distinguishes between single vision lenses, bifocal lenses, trifocal lenses, and progressive addition lenses,
wherein the processing of said image produces and stores a profile of a curve that is formed by an intersection of the sheet of light (56) and the illuminated surface of the optical component, the identification output of said given geometrical feature being produced from the profile of the curve, and the processing includes a calculation where the angle between the illumination and viewing directions is used to determine and store an exact value of at least one curvature radius of the produced profile of the curve.

2. The method for identification of a given geometrical feature of an optical component according to claim 1, wherein the angle between the illumination and viewing directions is substantially equal to 85°.

3. The method for identification of a given geometrical feature of an optical component according to claim 2, said method further comprising:
a step for determining a size parameter of the illuminated surface of the optical component.

4. The method for identification of a given geometrical feature of an optical component according to claim 2, said method further comprising:
a step of translating continuously the optical component along a translation direction perpendicular to the sheet of light in such a manner as to produce an image scanning of the surface.

5. The method for identification of a given geometrical feature of an optical component according to claim 1, said method further comprising:
a step for determining a size parameter of the illuminated surface of the optical component.

6. The method for identification of a given geometrical feature of an optical component according to claim 1, wherein the optical component has at least a spherical or aspherical surface, a sphero-toric surface, a progressive surface, a surface comprising a plurality of segments.

7. The method for identification of a given geometrical feature of an optical component according to claim 1, said method further comprising:
a step of translating continuously the optical component along a translation direction perpendicular to the sheet of light in such a manner as to produce an image scanning of the surface.

8. The method for identification of a given geometrical feature of an optical component carrying out a method according to claim 1, wherein the optical component is made of an organic material chosen within the list consisting of: polycarbonate, polymethyl methacrylate, CR39, CR607, MR8, MR7, Trivex.

9. The method for packing an optical component in a corresponding package, said package having a characterizing feature, where said method comprises using the method as claimed in claim 1 in such a manner as to identify a given geometrical feature of the optical component and then selecting the corresponding package thanks to correlation rules between said given geometrical feature of the optical component and the characterizing feature of the corresponding package.

10. A method for manufacturing a spectacle lens from a semi-finished lens blank for ophthalmic lens comprising a finished optical surface and a non-finished surface, said method comprising:
using the method for identification of a feature of an optical element as claimed in claim 1 in such a manner as to identify a given geometrical feature of the finished optical surface of the semi-finished lens blank; and
machining the non-finished surface of the semi-finished lens blank so as to obtain a prescription-optimized surface taking into account at least both individual data of a spectacle prescription and said geometrical feature of finished optical surface of the semi-finished lens blank.

11. A computer program product, recorded on a non-transitory computer readable medium, comprising one or more stored sequence of instructions executable by a processor and, when executed by the processor, causes the processor to:
process (38) an image built from collected light, said collected light collected from an emission of light emitted by an illuminated surface of an optical component, said optical component having an organic material such that the illuminated surface emits light at an emission wavelength $\lambda_e$ upon illumination by light at an illumination wavelength $\lambda_i$ which is different from the emission wavelength $\lambda_e$,
where the surface illuminated of the optical component and emitting the emission wavelength $\lambda_e$ is illuminated with an incident light beam comprising at least light at the illumination wavelength $\lambda_i$ but devoid light at the emission wavelength $\lambda_e$, and said illuminated surface of the optical component is illuminated in an illumination direction with the incident light beam having the form of a sheet of light (56) substantially perpendicular to said surface of the optical component, an angle between the illumination direction and the viewing direction being substantially between 5° and 90°;
apply metrics to compare the image with reference data that are specific to a given geometrical feature; and
produce and store an identification output of said given geometrical feature that distinguishes between single vision lenses, bifocal lenses, trifocal lenses, and progressive addition lenses,
wherein the processing of said image produces and stores a profile of a curve that is formed by an intersection of the sheet of light (56) and the illuminated surface of the optical component, the identification output of said given geometrical feature being produced from the profile of the curve, and the processing includes a calculation where the angle between the illumination and viewing directions is used to determine and store an exact value of at least one curvature radius of the produced profile of the curve.

12. A system (10, 50, 80) for identification of a given geometrical feature of an optical component (12), comprising:
an illumination source (14, 54) adapted to illuminate in an illumination direction a surface (16, 64) of the optical component (12) with an incident light beam having an illumination wavelength $\lambda_i$ and having the form of a sheet of light (56) substantially perpendicular to said surface of the optical component;
an imaging and detecting device (18) adapted to collect light emitted at an emission wavelength $\lambda_e$ by the surface (16, 64) of the optical component (12) in a viewing direction to build an image of the surface (16, 64), an angle between the illumination direction and the viewing direction being substantially between 5° and 90°, and the optical component (12) composed of a material that emits light at the emission wavelength $\lambda_e$ when illuminated by the illumination wavelength $\lambda_i$, and said emission wavelength $\lambda_e$ being different from said illumination wavelength $\lambda_i$; and
an image-processing device (20, 60) which comprises algorithms that apply metrics to compare the image with reference data that are specific to the given geometrical feature and produces and stores an identification output of said given geometrical feature that distinguishes between single vision lenses, bifocal lenses, trifocal lenses, and progressive addition lenses,
the image-processing device (60) further comprising algorithms to produce and store a profile of a curve that is formed by an intersection of the sheet of light (56) and the illuminated surface of the optical component, the identification output of said given geometrical feature being produced from the profile of the curve, and to carry out a calculation where the angle between the illumination and viewing directions is used to determine and store an exact value of at least one curvature radius of the produced profile of the curve.

13. The system for identification of a given geometrical feature of an optical component according to claim 12, wherein the angle between the illumination and viewing directions is substantially equal to 85°.

14. The system for identification of a given geometrical feature of an optical component according to claim 13, wherein said system further comprises a translation device (82) for continuously translating the optical component along a translation direction perpendicular to the illumination direction, and wherein imaging and detecting device (18) is synchronized with translation device (82).

15. The system for identification of a given geometrical feature of an optical component according to claim 12, wherein said system further comprises a translation device (82) for continuously translating the optical component along a translation direction perpendicular to the illumination direction, and wherein imaging and detecting device (18) is synchronized with translation device (82).

* * * * *